US006249764B1

(12) United States Patent
Kamae et al.

(10) Patent No.: US 6,249,764 B1
(45) Date of Patent: Jun. 19, 2001

(54) SYSTEM AND METHOD FOR RETRIEVING AND PRESENTING SPEECH INFORMATION

(75) Inventors: Takahiko Kamae, Kawasaki; Makoto Hirayama, Yokohama, both of (JP)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/257,327

(22) Filed: Feb. 25, 1999

(30) Foreign Application Priority Data

Feb. 27, 1998 (JP) .................................................. 10-046581

(51) Int. Cl.$^7$ .................................................. G10L 15/22
(52) U.S. Cl. ........................................ 704/270.1; 704/275
(58) Field of Search .................................... 704/275, 270, 704/272, 200, 270.1, 201, 220, 231, 278

(56) References Cited

U.S. PATENT DOCUMENTS

| 5,799,063 | * | 8/1998 | Krane ...................................... | 379/67 |
| 5,838,682 | * | 11/1998 | Dekelbaum ........................... | 370/401 |
| 5,890,123 | * | 3/1999 | Brown et al. ......................... | 704/275 |
| 5,903,892 | * | 5/1999 | Hoffert et al. ......................... | 707/10 |
| 5,926,789 | * | 7/1999 | Barbara et al. ....................... | 704/275 |
| 5,983,176 | * | 5/1999 | Hoffert et al. ........................ | 704/233 |
| 5,983,190 | * | 11/1999 | Trower, II et al. ................... | 704/276 |

OTHER PUBLICATIONS

ICASSP–91. Flanagan et al., "A digital Teleconferencing System with Integrated Modlities for Human/Machine Communication: Humanet". pp. 3577–3579, Apr. 1991.*
IEE Expert. Flammia, "Almost ther: Anew Medium on the Web". pp. 85–86, Jun. 1996.*
IEE Multimedia. Hemphill et al., "Speech Aware Multimedia". pp. 74–78, Apr. 1991.*
"Web On Call" Printouts from Web Site www.netphonic.com Feb. 9, 1998.

* cited by examiner

Primary Examiner—Richemond Dorvil

(57) ABSTRACT

In the method, speech files each representing speech information are provided. At least one of the speech files is a hyperspeech file that represents speech information and includes a hot spot specification specifying a hot spot in the speech information. The hot spot identifies additional speech information. The hot spot specification comprises a hot spot definition defining the hot spot and an identifier identifying another of the speech files that represents the additional speech information. A speech information presentation operation is iteratively performed until the desired speech information is presented. In this operation, a speech file retrieval operation that retrieves one of the speech files is performed, any hot spot specification in the speech file is extracted, a speech signal is generated from the speech file, and the speech information is presented in response to the speech signal. The speech signal includes a distinguishing portion that distinguishes each hot spot from the remainder of the speech information when the speech information is presented. When the speech information presented is not the desired speech information, a user request signal is provided during the hot spot to request presentation of the additional speech information identified by the speech information presented during the hot spot. The identifier included in the hot spot specification is referenced in response to the user request signal. The identifier identifies the speech file to be retrieved when the speech file retrieval operation is next performed.

21 Claims, 5 Drawing Sheets

SYSTEM AND METHOD FOR RETRIEVING AND PRESENTING SPEECH INFORMATION

FIELD OF THE INVENTION

The invention relates to a system and method for retrieving speech information and for presenting such information to a user. In particular, the invention relates to a system and method for specifying, retrieving, and presenting the speech information desired by the user.

BACKGROUND OF THE INVENTION

Recently, a large variety of information has become available over the Internet. A user can retrieve and display such information using a personal computer located at various places including the home. The user can use a browser operating through the World-Wide Web that extends throughout the world to retrieve and display the information. Information retrieved from the Internet and displayed to the user includes words or phrases distinguished from the remainder of the information by such devices as underlining or display in a different color. Such words or phrases include concealed links to other World-Wide Web pages containing additional information. The words or phrases distinguished in this way are called hot spots. The user can obtain additional information related to the hot spot by moving the mouse pointer to the hot spot and clicking a button on the mouse. The browser responds by jumping to the web page linked to the word or phrase. This web page provides the additional information.

A terminal, such as a personal computer, that includes a graphics display is required to perform the Web-based information retrieval method just described. If a computer or other graphics display device is not available, information cannot normally be retrieved using the World-Wide Web. Moreover, even if a computer or other graphics display device is available, the user may not be able to retrieve the information if the user is unable to operate a pointing device, such as a mouse, or if the user is unable to see the information displayed on a screen. This may occur, for example, if the user is physically or visually handicapped. Moreover, it may be difficult for a bedridden person to see a graphics display device, to operate a mouse and to type using a keyboard. It has been proposed to solve these problems by using speech to present information in a manner analogous to the way information is presented in Web pages.

Automated speech has been used to present information in a variety of fields as a way of reducing labor costs. Current methods for providing information using automated speech are based on conventional telephone networks and have many operational problems. Such systems are unable to present information using speech in a manner analogous to the way in which information is presented in Web pages. One reason for this is the difficulty in including in speech a feature analogous to the above-described hot spots. Conventional ways of presenting information using speech provide the user with rudimentary choices by presenting the user with multi-item menus to which the user responds by entering a number using the keypad on the telephone.

An example of a conventional way of presenting information using speech will now be described. In this, a recorded or synthesized voice makes the following announcement: "After the beep, please enter your location: 1. Tokyo, 2. Kanagawa, 3. Saitama, 4. Chiba, 5. Yamanashi." After the beep, the user uses the keypad of the telephone to enter the number corresponding to his or her choice. Information has to be presented in this way because hot spots are not included in the speech information defining the menu. The drawback of this method is that the user has to listen until the whole menu has been presented because the user does not know the whole menu until the whole menu has been presented. In addition, during presentation of the whole menu, the user must remember the number corresponding to the user's choice while continuing to listen for a more appropriate choice. If the menu is long, a memory lapse or confusion on the part of the user may result in the user entering the incorrect number. Conventional systems try to overcome this problem by presenting only simple menus. If many choices are available, several menus may be required. This increases in the time required for the user to retrieve the information he or she desires and increases the possibility of the user making an incorrect choice. Conventional ways of presenting information using speech also have operability problems. For example, such ways may lack the ability to return to a previous menu. Thus, conventional ways of presenting information using speech have problems in function and operation, and may not be able to provide the exact information desired by the user when the user requires extensive, in-depth information.

What is needed, therefore, is an improved system and method for retrieving and presenting information using speech. Such system and method should provide improved convenience and operability in terms of selecting, detecting, retrieving, and presenting the information desired by the user. The system and method should use a simple operating method to present to the user speech information covering a broad range of content and in the depth desired by the user.

What also is needed is a system and method for retrieving and presenting speech information that operates analogously to the way in which a web browser retrieves and presents information using the World-Wide Web.

SUMMARY OF THE INVENTION

The invention provides a method of retrieving and presenting a desired item of speech information. In the method, speech files are provided, and a speech information presentation operation is iteratively performed until the speech information presentation operation present the desired speech information. In the speech information presentation operation, a speech file is retrieved and the speech information represented by the speech file is presented. Each speech file represents an item of speech information. At least one of the speech files is a hyperspeech file that represents an item of speech information and includes a hot spot specification specifying a hot spot in the item of speech information. The hot spot specification comprises a hot spot definition and an identifier. The hot spot definition defines the hot spot in the speech information. During the hot spot, the speech information identifies additional speech information. The identifier identifies another of the speech files that represents the additional speech information. The speech file retrieved first is a hyperspeech file.

In the iteratively-performed speech information presentation operation, a speech file retrieval operation is performed in which one of the speech files is retrieved, any hot spot specification comprised therein is extracted, and a speech signal is generated therefrom. The speech signal includes a distinguishing portion corresponding to any hot spot specified therein. The speech information is presented in response to the speech signal. The distinguishing portion included in the speech signal distinguishes the hot spot from the remainder of the speech information during presentation of the speech information. When the speech information presented is not the desired speech information, a user request signal is provided during the hot spot to request presentation of the item of additional speech information identified by the speech information presented during the hot spot. The identifier included in the hot spot specification is referenced in response to the user request signal. The identifier identifies the speech file that will be retrieved when the speech file retrieval operation is next performed.

The invention also provides a system for retrieving and presenting a desired item of speech information. The system comprises speech files, a hyperspeech file processor and a user interface device linked to the hyperspeech file processor. Each of the speech files represents an item of speech information. At least one of the speech files is a hyperspeech file representing an item of speech information and including a hot spot specification specifying a hot spot in the item of speech information. The hot spot specification comprises a hot spot definition and an identifier. The hot spot definition defines the hot spot in the speech information. During the hot spot, the speech information identifies an item of additional speech information. The identifier identifies another speech file that represents the item of additional speech information.

The hyperspeech file processor includes a speech file retrieval module and a speech file processing module. The speech file retrieval module retrieves a speech file identified by the identifier included in a hot spot specification in response to a user request signal. The speech file processing module separates from the speech file retrieved by the speech file retrieval module any hot spot specification comprised in the speech file and generates a speech signal from the speech file. The speech signal includes a distinguishing portion corresponding to any hot spot specified therein.

The user interface device includes a presentation module and a user request signal generator. The presentation module presents speech information in response to the speech signal received from the hyperspeech file processor. During presentation of the speech information, the distinguishing portion included in the speech signal distinguishes the hot spot from the remainder of the speech information. The user request signal generator generates the user request signal for transmission to the hyperspeech file processor during the hot spot to request presentation of an item of additional speech information identified by the speech information presented during the hot spot.

The speech file retrieval module of the speech file processor additionally includes an identifying module that operates in response to the user request signal to reference the identifier included in the hot spot specification to identify the next speech file to be retrieved by the speech file retrieval module. The next speech file represents the item of additional speech information.

DETAILED DESCRIPTION OF THE INVENTION

Figure 1:
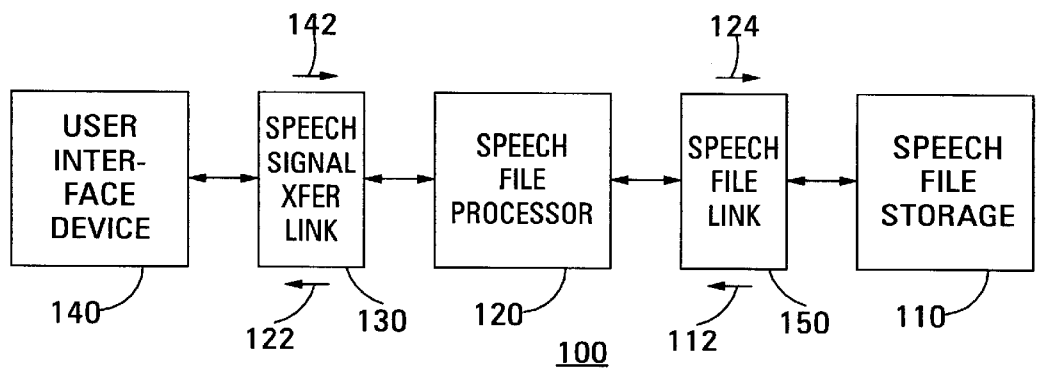
FIG. 1 is a block diagram of a first embodiment of a system according to the invention for retrieving and presenting speech information and that can be used to perform the speech information retrieval and presentation method according to the invention.

The invention is based on the concept of a presentation to a user of speech information that includes at least one hot spot. A hot spot is a period of time during the presentation of the speech information in which an item of available additional speech information is identified and in which the user can provide a signal indicating that he or she wants to hear the item of additional speech information. The portion of the speech information identifying the additional speech information will be called a hot-spot phrase on the understanding that, in its simplest form, a hot-spot phrase can be composed of a single word. Each hot spot in the speech information is specified by a hot spot specification that defines the location of the hot spot in the speech information and that includes the identifier of a speech file that represents the item of additional speech information identified by the hot-spot phrase corresponding to the hot spot.

An item of speech information is represented by a speech file. A type of speech file that represents an item of speech information and that includes a hot-spot specification for at least one hot spot included in the speech information is called a hyperspeech file. The item of additional speech information is represented by a speech file. This speech file is a hyperspeech file if it includes a hot spot specification for at least one hot spot included in the additional speech information.

The system and method of the invention present items of speech information to the user by retrieving one or more speech files, at least one of which is a hyperspeech file, and deriving a speech signal from each of the speech files. The speech information is presented in response to the speech signal. Items of speech information are successively presented until the item of speech information that includes the information desired by the user is presented.

An item of speech information represented by a hyperspeech file includes at least one hot spot. During the hot spot, a portion of the speech information constituting the corresponding hot-spot phrase indicates the availability of the item of additional speech information. During presentation of the speech information to the user, the hot spots are distinguished from the remainder of the speech information in a manner that enables the user to recognize them. Each hot spot indicates to the user that the item of additional speech information identified by the corresponding hot-spot phrase is available. The hot spots can be aurally distinguished from the remainder of the speech information, or can be distinguished in some other way capable of recognition by one or more of the user's senses other than the user's sense of hearing.

When the speech information is presented to the user, each hot spot begins at the time when or shortly after its corresponding hot-spot phrase is presented. The hot spot lasts typically for several seconds, but may not normally overlap the beginning of the next hot spot. The hot spot is distinguished from the remainder of the speech information as described above.

During each hot spot, the corresponding hot-spot phrase is presented to identify the item of additional speech information available to the user. If the user wishes to hear the item of additional speech information identified by the hot-spot phrase, he or she provides a user request signal during the hot spot to request that the additional speech information be presented. Receipt of the user request signal during the hot spot causes the system or method according to the invention to retrieve the speech file identified by the identifier contained in the hot spot specification that defines the hot spot. The system or method then processes the speech file to generate a speech signal and presents the speech information represented by the speech file to the user instead of the original speech information that the user was previously listening to. On the other hand, if the user provides no user request signal during the hot spot, or if the user provides the user request signal after the end of the hot spot, presentation of the original speech information continues.

As noted above, the retrieved speech file may be a hyperspeech file that represents the item of additional speech information and that includes one or more hot spot specifications. Each of the hot spot specifications defines a hot spot in the additional speech information and includes an identifier for another speech file that includes more additional speech information. Again, the other speech file may be a hyperspeech file.

As noted above, each hot spot included in the speech information presented to the user is distinguished from the remainder of the speech information in a way that enables the user to recognize the hot spot and to understand that the item of additional speech information identified by the hot-spot phrase presented during the hot spot is available. The speech information is presented to the user in response to a speech signal. The speech signal includes a hot spot distinguishing signal that distinguishes each of the hot spots from the remainder of the speech information. Changes in the speech signal resulting from corresponding changes in the speech information represented by the speech file during each hot spot can provide the hot spot distinguishing signal. Alternatively, the hot spot distinguishing signal can be generated independently of the speech file.

The speech information represented by the speech file can be changed in several ways to provide the hot spot distinguishing signal used to distinguish the hot spots from the remainder of the speech information. For example, the tone of the voice, or the type of voice, speaking the speech information can change during each hot spot to provide the hot spot distinguishing signal. For example, the speech information can be presented by a female voice speaking during each hot spot while the remainder of the speech information can be presented by a male voice speaking. Alternatively, during each hot spot, the speech file can represent a distinguishing tone superimposed on the speech information to provide the hot spot distinguishing signal. When the speech signal is derived from the speech file, the distinguishing tone represented by the speech file carries over into the speech signal. Thus, the distinguishing tone is superimposed on the speech information when the latter is presented to the user. The distinguishing tone presented together with the speech information enables the user to recognize each hot spot. In all of the above examples, the hot spot distinguishing signal included in the speech signal during each hot spot is the result of a change to the speech information represented by the speech file.

Alternatively, the speech information represented by the speech file can remain unchanged during the hot spots. In this case, the hot spot distinguishing signal for each hot spot is generated in response to the hot spot specification and is included in the speech signal. When the speech information is presented to the user in response to the speech signal, a distinguishing tone audible by the user is generated during the hot spot in response to the distinguishing signal and is superimposed on the speech information. Alternatively, the hot spot distinguishing signal included in the speech signal can be fed to a transducer that generates a stimulus that can be recognized by at least one other of the user's five senses. The stimulus is presented to the user simultaneously with the hot spot. For example, during each hot spot, the hot spot distinguishing signal can be fed to a vibratory transducer held or worn by the user to cause the transducer to vibrate during the hot spot. As another example, the hot spot distinguishing signal can be fed to a lamp to cause the lamp to generate light during the hot spot.

During a hot spot, the user can provide in several different ways a signal indicating that he or she wants to listen to the item of additional speech information identified by the corresponding hot-spot phrase. For example, the user can provide a signal by speaking. As another example, the user can provide the signal by pushing one or more push-buttons or by operating similar controls. For example, if a push-button telephone is used to present the speech information to the user, the user can provide the signal by pushing a specific key on the keypad of the telephone.

FIG. 1 is a block diagram showing the basic arrangement of a first embodiment of a system 100 according to the invention for retrieving and presenting speech information.

The system can be used to practice the method according to the invention for retrieving and presenting speech information. The system includes the speech file storage device 110 in which speech files are stored. At least of one the speech files is a hyperspeech file. Speech files may additionally be stored on other speech file storage devices (not shown) forming part of the system. In this case, one of the speech files stored in the entire system must be a hyperspeech file. The speech file transfer link 150 couples the speech file storage devices included in the system to the speech file processor 120. The speech file processor is coupled by the speech signal transfer link 130 to the user interface device 140.

Figures 2A, 2B:
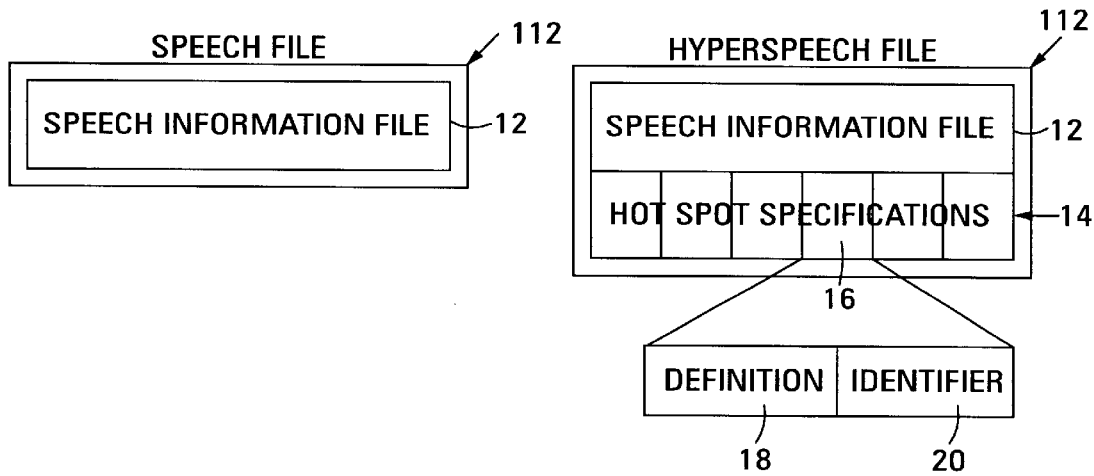
FIG. 2A is a block diagram showing the composition of a speech file used in the system and method according to the invention for retrieving and presenting speech information.
FIG. 2B is a block diagram showing the composition of a hyperspeech file used in the system and method according to the invention for retrieving and presenting speech information.

FIGS. 2A and 2B show the structures of the two types of speech files stored in the speech file storage device 110. FIG. 2A shows the basic structure of the speech file 112. In this structure, the speech file 112 is composed of the speech information file 12. FIG. 2B shows the structure of the speech file 112 when the speech file is a hyperspeech file. In this structure, the speech file is composed of the speech information file 12 and additionally includes the hot spot specifications 14. Each of the hot spot specifications defines one hot spot in the speech information represented by the speech information file 12. The exemplary hot spot specification 16 includes the hot spot definition 18 defining the hot spot, and the identifier 20 identifying the speech file that represents the item of additional speech information corresponding to the hot spot. Examples of four embodiments of the hyperspeech file will be described below with reference to FIGS. 3A, 3B, 4A, 4B, 5 and 6.

Referring now to FIGS. 1, 2A and 2B, speech files having the format shown in FIG. 2A or 2B are created and are stored in the speech file storage device 110. At least one of the speech files is a hyperspeech file as shown in FIG. 2B. To present speech information to the user, the speech file processor 120 performs a file retrieval operation using the speech file storage device 110. In this, the speech file processor provides a file identifier 124 to the speech file storage device via the speech file transfer link 150. The file identifier identifies the speech file required. In response to the file identifier, the speech file storage device transmits the speech file 112 corresponding to the file identifier back to the speech file processor via the speech file transfer link. The speech file processor processes the speech file received from the speech file storage device to derive the speech signal 122 from it. When the speech file is a hyperspeech file, the speech file processor separates the hot spot specifications 14 from the speech information file 12 before deriving the speech signal from the speech information file. The speech file processor temporarily stores the hot spot specifications.

To derive the speech signal 122, the speech file processor 120 processes the speech information file included in the speech file 112 to convert the speech information represented thereby to a speech signal of the format required by the user interface device 140. For example, if the speech information file includes digitally-encoded speech information, the speech file processor may include a digital-to-analog converter that converts the digitally-encoded speech information to an analog speech signal 122 capable of transmission via an analog or digital telephone line providing the speech signal transfer link 130 to the user interface device 140. As another example, the speech file processor may include a digital transcoder that converts the form of digitally-encoded speech information included in the speech information file 12 included in the speech file received from the speech file storage device 110 to the form of digital speech signal 122 required by the user interface device 140 and capable of transmission via a digital network providing the speech signal transfer link 130.

The user interface device 140 receives the speech signal 122 from the speech file processor 120, derives an audio signal from the speech signal and feeds the audio signal to a sound transducer (not shown) that forms part of the user interface device and that presents the speech information to the user. A user listening to the sound generated by the sound transducer in response to the audio signal will hear an audible version of the speech information, including the hot spots each indicating the availability of an item of additional speech information.

When the user interface device 140 presents the speech information in response to the speech signal 122, each hot spot is distinguished from the remainder of the speech information so that the user can recognize that an item of additional speech information is available and can signal when he or she wants to hear the item of additional speech information identified by the corresponding hot-spot phrase. To hear the additional speech information indicated by the hot-spot phrase, the user causes the user interface device to transmit a user request signal 142 to the speech file processor. The user request signal may be an analog or digital signal representing a word spoken by the user, for example, or may be a digital or analog signal generated in response to, or representing, a key pressed by the user on a control panel, keyboard or telephone keypad forming part of the user interface device, or some other signal transmitted by the user interface device in response to the user indicating that he or she wants to hear the item of additional speech information identified by the hot-spot phrase.

The speech file processor 120 detects the user request signal 142 generated by the user interface device 140 during the hot spot. The speech file processor references the identifier forming part the hot spot specification of the hot spot and transfers the identifier 124 via the speech file transfer link 150 to the speech file storage device 110. The identifier identifies the speech file representing the item of additional speech information in the speech file storage device. In systems including multiple speech file storage devices linked to the speech file processor by the speech file transfer link, the identifier also identifies the speech file storage device on which the speech file is stored.

The speech file storage device, for example, the speech file storage device 110, identified by the identifier transferred through the speech file transfer link 150 by the speech file processor 120 transfers the speech file 112 identified by the identifier to the speech file processor. The speech file represents the item of additional speech information requested by the user, and may be a speech file as shown in FIG. 2A or a hyperspeech file as shown in FIG. 2B. In the former case, the speech file processor simply retrieves the speech information file 12 from the speech file representing the item of additional speech information, derives the speech signal from the speech information file, and transfers the speech signal 122 via the speech signal transfer link 130 to the user interface device 140. In the latter case, the speech file processor performs the processing described above on the hyperspeech file that includes the speech information file representing the item of additional speech information, temporarily stores the hot spot specifications included in the hyperspeech file, derives the speech signal 122 from the speech information file and transfers the speech signal via the speech signal transfer link to the user interface device. In either case, the speech signal is transferred in a format compatible with the speech signal transfer link and with the user interface device. The user interface device then generates an audio signal from the speech signal to present the additional speech information to the user.

Again, if the item of additional speech information is represented by a speech file that is a hyperspeech file, the speech information includes one or more hot spots. In this case, the user may provide, during any hot spot, a signal requesting such further additional speech information as is identified by the corresponding hot-spot phrase, as described above. This way, the user can follow a series of links identified by the hot-spot phrases in a series of hyperspeech files until he or she obtains the speech information he or she desires.

The system and method just described can easily be realized using a public communications network such as a telephone system or bidirectional cable television system, a private communications network, or other information transmission system as the speech signal transfer link 130, and using the Internet, an intranet, or another information retrieval system as the speech file transfer link 150.

Examples of a number of alternative structures for the hyperspeech files employed by the invention will now be described.

Figure 3A:
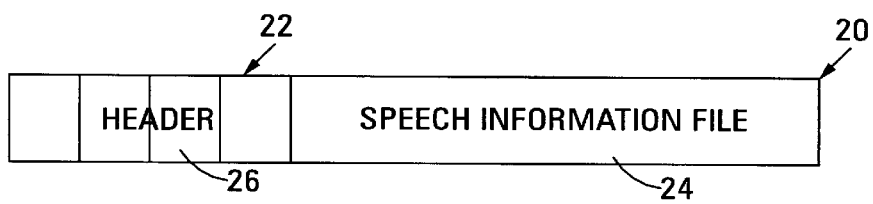
FIG. 3A shows the structure of a first embodiment of a hyperspeech file used in the system and method according to the invention for retrieving and presenting speech information.

FIG. 3A shows a first example 20 in which the hyperspeech file is composed of the header 22 and the speech information file 24. The hot spot specifications of all the hot spots in the speech file are stored in the header. An exemplary hot spot specification is shown at 26. Other data relating to the speech information file may additionally be included at predetermined locations in the header.

Figure 3B:
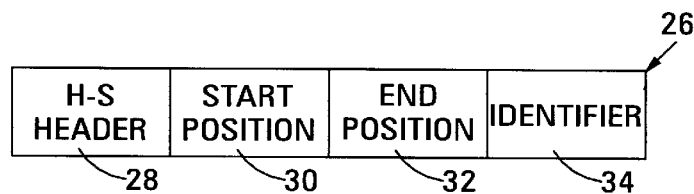
FIG. 3B shows the structure of the hot spot specifications included in the first embodiment of the hyperspeech file shown in FIG. 3A.

FIG. 3B shows details of the structure of the exemplary hot spot specification 26 included in the header 22 of the first example 20. The hot spot specification 26 includes the following elements: the hot spot specification header 28, the start position 30, the end position 32 and the identifier 34. The order of the elements following the hot spot specification header is not critical. The hot spot specification header identifies the data following the header as a hot spot specification, and may also specify the number of bytes constituting the hot spot specification. The start position and the end position indicate the start and the end, respectively, of the hot spot in terms of the speech file 24. The identifier identifies the speech file that represents the item of additional speech information indicated by the hot-spot phrase corresponding to the hot spot. For example, the identifier may identify the location in the speech file storage device 110 of the speech file that represents the item of additional speech information.

The hot spot header 28 may also include data specifying the sequence number of the hot spot specification, e.g., data indicating that the hot spot specification is the hot spot specification of the n-th hot spot in the speech information represented by the speech information file 24. The start position 30 may indicate the start of the hot spot in terms of, for example, the elapsed time between the start of the hot spot from the beginning of the speech information when the speech information is presented, the number of bytes in the speech information file between the start of the hot spot and the end of the immediately-preceding hot spot, or the number of bytes between the head of the speech information file and the start of the hot spot. The end position 32 may indicate the end of the hot spot in terms of, for example, the elapsed time between the end of the hot spot and the start of the speech information when the speech information is presented, the number of bytes in the speech information file between the start and the end of the hot spot or the number of bytes between the head of the speech information file and the end of the hot spot.

Figure 4A:
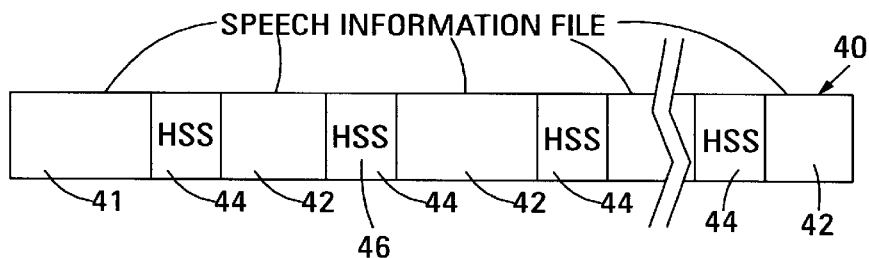
FIG. 4A shows the structure of a second embodiment of a hyperspeech file used in the system and method according to the invention for retrieving and presenting speech information.
Figure 4B:
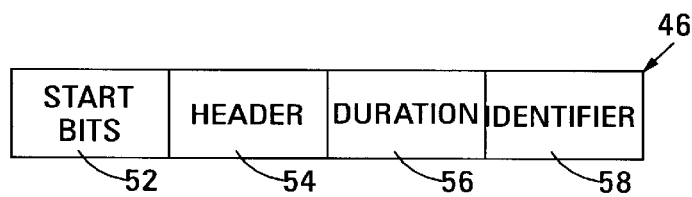
FIG. 4B shows the structure of the hot spot specifications included in the second embodiment of the hyperspeech file shown in FIG. 4A.

FIGS. 4A and 4B show a second example 40 of a hyperspeech file in which the speech information file is divided into segments. Each segment begins with a hot spot and is preceded by the hot spot specification (HSS) for the hot spot. The speech information file segments are shown at 42 and their corresponding hot spot specifications are shown at 44. In most instances, the first segment 41 does not begin with a hot spot and is therefore not preceded by a hot spot specification.

In the hyperspeech file 40, the hot spot specifications are distinguished from the segments of the speech information file by start bits at the beginning of each hot spot specification. The start bits are a special bit pattern, for example, the bit pattern $FF_H$, that is not part of the bit pattern set of the speech information file. Accordingly, each occurrence of the special bit pattern in the hyperspeech file indicates the beginning of a hot spot specification. The hot spot specifications may be of a fixed length, or may have a variable length. In the latter case, the length of each hot spot specification is specified in the hot spot specification header.

FIG. 4B shows details of the exemplary hot spot specification 46. In the example shown, the hot spot specification is composed of the following elements: the start bits 52, the header 54, the hot spot duration 56 and the identifier 58. The order of the elements after the header is not critical. The header may include data specifying the number of bytes constituting the hot spot specification, for example. The hot spot duration defines duration of the hot spot in terms of time or the number of bytes of the hyperspeech file 40, the speech information file or the segment 42 of the speech information file that includes the hot spot specified by the hot spot specification. The identifier identifies the speech file that represents the item of additional speech information indicated by the corresponding hot-spot phrase. As noted above, the speech file identified by the identifier may be another hyperspeech file.

In the hyperspeech file 40, the hot spot specification may be offset from the beginning of the hot spot that it specifies. In this case, the hot spot is not at the beginning of the speech information file segment that follows the hot spot specification, but occurs some time after the beginning of the segment, and the hot spot specification additionally includes data defining the offset of the start of the hot spot from the beginning of the segment. The offset can be defined in terms of time or bytes.

Figure 5:
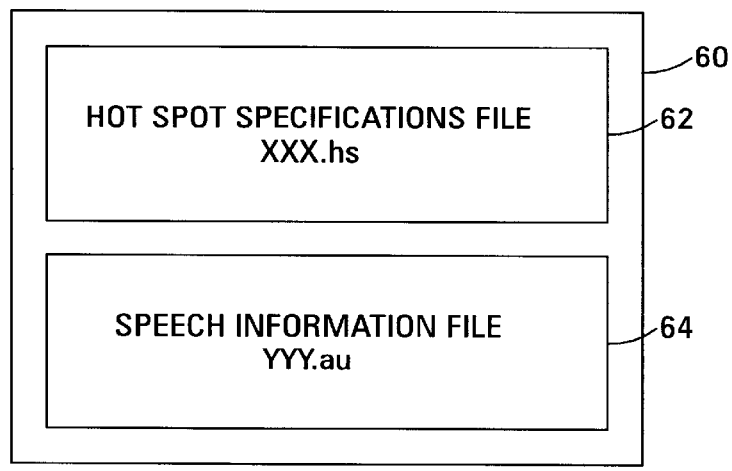
FIG. 5 shows the structure of a third embodiment of a hyperspeech file used in the system and method according to the invention for retrieving and presenting speech information.

FIG. 5 shows a third example in which the hyperspeech file 60 is composed of the specification file 62 containing the hot spot specifications and the speech information file 64. In the example shown, the hot spot specifications are stored in the hot spot specifications file named XXX.hs and the speech information is stored in the speech information file named YYY.au. The speech file processor 120 receives the hyperspeech file 60 including both files from the speech file storage device 110 and performs the processing described above on the files included in the hyperspeech file. The contents of the files are similar to the contents shown in FIGS. 3A and 3B.

Figure 6:
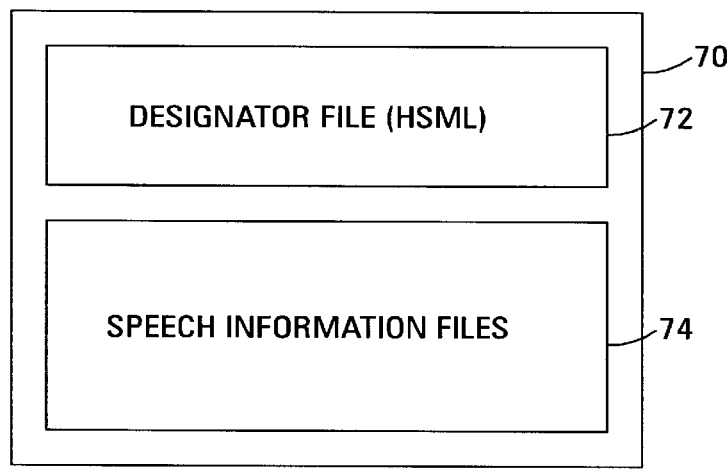
FIG. 6 shows the structure of a fourth embodiment of a hyperspeech file used in the system and method according to the invention for retrieving and presenting speech information.

FIG. 6 shows a fourth example in which the hyperspeech file 70 is composed of the descriptor files 72 and the speech information files 74. Each descriptor file contains the hot spot specifications written in a special hyperspeech file description language. Each descriptor file defines hot spots in the speech information represented by a corresponding one of the speech information files. Some of the speech information files may lack corresponding descriptor files and may simply represent the additional speech information identified by the hot-spot phrases in one or more the speech files that have corresponding descriptor files. For each hot spot defined in the speech information represented by one of the speech information files, the corresponding descriptor file includes a hot spot specification. The hot spot specification defines the hot spot and includes an identifier that identifies another speech information file that represents the item of additional speech information referred to by the corresponding hot-spot phrase. The speech information file that represents the item of additional speech information may form part of the hyperspeech file 70 or may form part of a different hyperspeech file. In this example, the identifier that forms part of each hot spot specification is in the form of a Uniform Resource Locator (URL).

When the hyperspeech file example shown in FIG. 6 is stored in the speech file storage device 110 in the system 100 shown in FIG. 1, and the speech file storage device 110 transfers the hyperspeech file 70 to the speech file processor 120, the descriptor files 72 are transferred first. The speech file processor reads the first descriptor file received from the speech file storage device, and processes the speech information file corresponding to the descriptor file in the manner described above to derive a speech signal for transfer to the user interface device 140. The user interface device presents the speech information to the user in response to the speech signal. During presentation of the speech information represented by the speech information file, the speech file processor processes the hot spot specifications included in the corresponding descriptor file in a manner similar to that described above. As a result, the speech file processor is able to respond to a user request signal provided by the user to request the presentation of an item of additional speech information. The user request signal causes the speech file processor to process another of the files included in the hyperspeech file 70. The other of the files may be a descriptor file, in which case the speech information file corresponding to the descriptor file is also processed, or may simply be a speech information file. Alternatively, the user request signal may cause the speech file processor to retrieve another hyperspeech file and process it.

An example of the language in which the descriptor file 72 is written is set forth below. The language resembles the HyperText Markup Language (HTML) used on the World-Wide Web, but the language is extended to enable it to describe the speech information files and hot spot specifications included in a hyperspeech file. This language is called the HyperSpeech Markup Language (HSML).

HSML Example (weather.hsml)

<HSML>
<HEAD>
<TITLE>Tomorrow's Weather</TITLE>
</HEAD>
<BODY>
<AUDIOsrc="weather.au">
<AUDIOMAP>
<AUDIOAREAstart="00:00:20"end="0:00:30"href="tokyo.au">
<AUDIOAREAstart="00:00:35"end="00:00:45"href="kanagawa.au">
<AUDIOAREAstart="00:00:50"end="00:01:00"href="weekly.hsml">
</AUDIOMAP>
</BODY>
</HSML>

The descriptor file 72 set forth above is stored in the speech file storage device 110 under the name weather.hsml, for example, as part of the hyperspeech file 70. The symbols <HSML> and </HSML> respectively indicate the beginning and end of the descriptor file. The symbols <HEAD> and </HEAD> respectively indicate the beginning and the end of the header of the descriptor file. The symbols <TITLE> and </TITLE> respectively indicate the beginning and end of the title of the descriptor file. The symbols <BODY> and </BODY> respectively indicate the beginning and the end of the body portion of the descriptor file. The above symbols resemble corresponding definitions in HTML.

In the body portion of the descriptor file 72, the line <AUDIO src="weather.au"> defines the URL of the speech information file corresponding to the descriptor file weather.hsml. In this example, the file name "weather.au" is used as the URL of the speech information file. The symbols <AUDIOMAP> and </AUDIOMAP> respectively indicate the beginning and the end of the hot spot specifications for the speech information file "weather.au".

Each line beginning with <AUDIOAREA is a hot spot specification. The first line defines a hot spot extending from 0 h, 0 m, 20 s to 0 h, 0 m, 30 s of the speech information represented by the speech information file weather.au. The user causing the user interface device 140 to providing a user request signal during this hot spot causes the speech file processor 120 to process the speech information file specified by the URL in the hot spot specification, i.e., the speech information file having the file name "tokyo.au." This is one of the speech information files included in the hyperspeech file 70.

Similarly, the second line beginning with <AUDIOAREA defines a hot spot extending from 0 h, 0 m, 35 s to 0 h, 0 m, 45 s of the speech information represented by the speech information file weather.au. The user causing the user interface device 140 to provide a user request signal during this hot spot causes the speech file processor to process the speech information file specified by the URL included in the hot spot specification, i.e., the speech information file having the file name "kanagawa.au." This is another of the speech information files included in the hyperspeech file 70.

The third line beginning with <AUDIOAREA defines a hot spot extending from 0 h, 0 m, 50 s to 0 h, 1 m, 0 s of the speech information represented by the speech information file weather.au. The user causing the user interface device 140 to provide a user request signal during this hot spot causes the speech file processor to operate in response to the URL included in the hot spot specification i.e., the hyperspeech file having the file name "weekly.hsml." Since this hyperspeech file is not part of the hyperspeech file 70, the speech file processor transfers the URL of this hyperspeech file to the speech file storage device 110. In response, the speech file storage transfers the hyperspeech file having the file name to the speech file processor. The speech file processor then interprets and executes the descriptor file having the file name of "weekly.hsml." This is the first descriptor file of the hyperspeech file "weekly.hsml", which is a hyperspeech file different from the hyperspeech file 70. The descriptor file is written in HSML and has the URL of weekly.hsml. The descriptor file weekly.hsml has a structure similar to that of weather.hsml, and includes URLs indicating speech information files constituting the corresponding hyperspeech file.

A second embodiment of a system according to the invention for retrieving and presenting speech information will now be described with reference to FIG. 7. This embodiment is based on the World-Wide Web and can also be used to practice the method according to the invention. In this embodiment, elements that correspond to elements of the embodiment shown in FIG. 1 are indicated using the same reference numerals and will not be described again here. In the embodiment shown in FIG. 7, the World-Wide Web 250 based on the Internet provides the speech file transfer link, and the public network 230 provides the speech signal transfer link. A number of web sites that include a speech file storage device are shown connected to the World-Wide Web. The speech file storage device 110 is shown located at the web site 210, for example.

The speech file processor 120 forms part of the speech information gateway 220. The speech file processor 120 may be one of a number of speech file processors located at the speech information gateway 220. Moreover, multiple speech information gateways similar to the gateway 220 may be connected through the World-Wide Web to web sites, such as the web site 210, that include speech file storage devices. Each speech file processor in the speech information gateway 220, including the speech file processor 120, is connected to the World-Wide Web. Thus, the speech file processor 120 can retrieve speech files from speech file storage devices, such as the speech file storage device 110, located anywhere in the world.

The speech file processor 120 in the speech information gateway 220 is also connected to the public network 230. Others of the speech file processors may also be connected to the public network 230, or may be connected to other public networks or other systems or devices capable of transmitting speech files to user interface devices. A user having a user interface device 140 can use the public network 230 to connect to one of the speech file processors at the speech information gateway when he or she desires to retrieve some speech information. The public network is typically a dial-up network, but may be a packetized network based on a cable television, satellite or terrestrial wireless distribution system, for example. Each user interface may alternatively be connected to a respective speech file processor by a dedicated line. Moreover, the speech file processor and the user interface device may be integrated into a single unit connected to the World-Wide Web.

Figure 8:
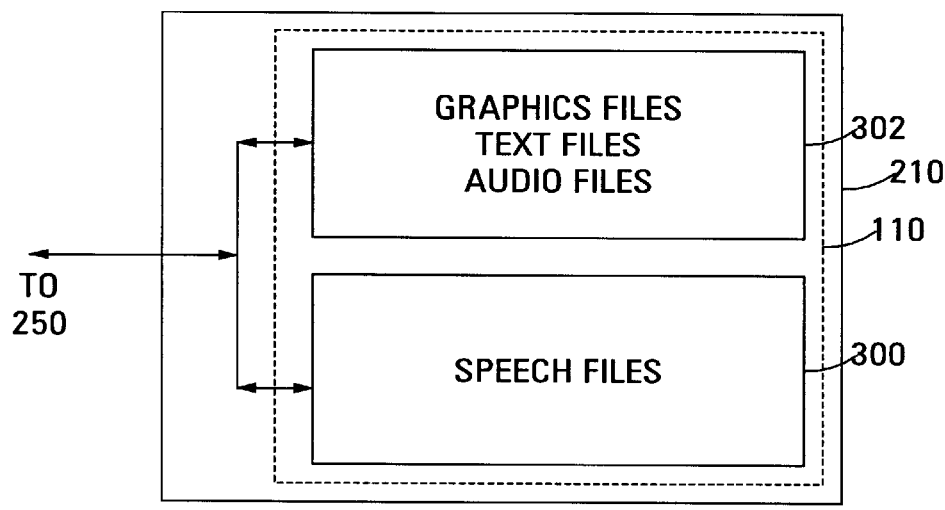
FIG. 8 is a block diagram showing the different types of information stored at a World-Wide Web site in the system and method according to the invention for retrieving and presenting speech information invention.

In the World-Wide Web, each web site specified by at least part of a URL usually stores graphics files, text files, and audio files. The files requested by the user are transferred from the web site to the user's terminal, and the user's terminal presents the corresponding graphics, text and audio to the user. FIG. 8 shows the web site 210, which is specified by at least part of a URL, where the speech files 300 are stored on the speech file storage device 110 in addition to the graphics files, text files and audio files collectively indicated by the reference numeral 302. Some of the speech files are hyperspeech files. Alternatively, the speech file storage device may store the speech files instead of all or some of the graphics files, text files, and audio files.

Figure 7:
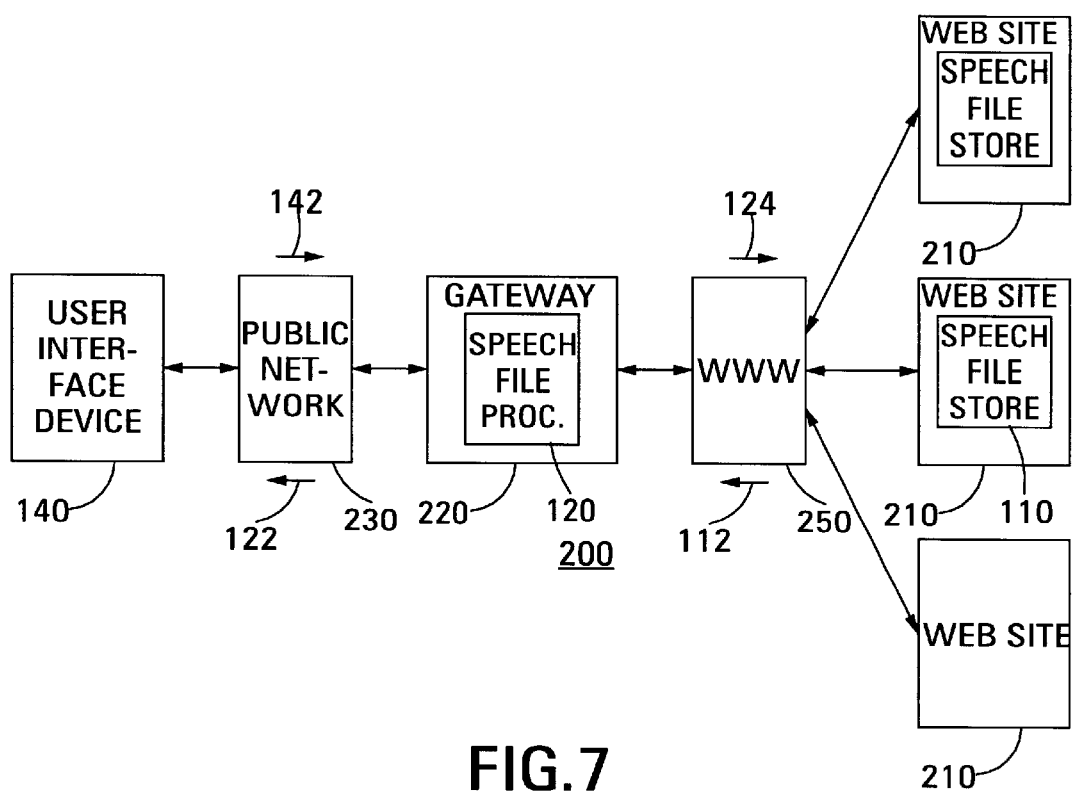
FIG. 7 is a block diagram of a second, World-Wide Web-based, embodiment of a system and method according to the invention for retrieving and presenting speech information.
Figure 9:
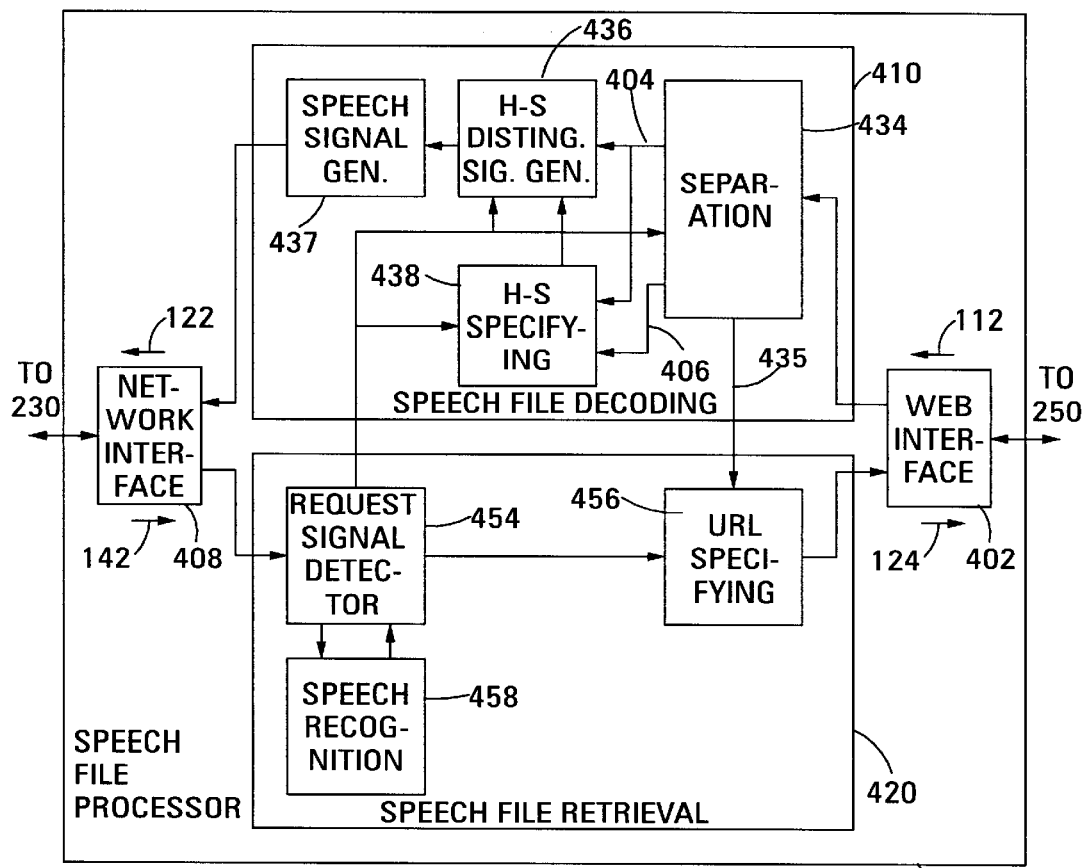
FIG. 9 is a block diagram of the speech file processor located at the speech information gateway of the World-Wide Web-based embodiment of the system and method according to the invention for retrieving and presenting speech information.

FIG. 9 is a block diagram showing the speech file processor 120 that forms part of the system 200 shown in FIG. 7. The speech file processor 120 comprises web interface 402, the speech file processing module 410, the speech file retrieval module 420 and the network interface 408. The speech file processor is connected to the user interface device 140 through the public network 230 as the speech signal transfer link, and is connected to the speech file storage device 110 located at the World-Wide Web site 210 through the World-Wide Web 250 as the speech file transfer link, as shown in FIG. 7.

In the speech file processor 120, the speech file processing module 410 receives a speech file 112 from the web site 210 through the World-Wide Web 250. The speech file is received by the web interface 402 and passes to the separation block 434. The separation block processes the speech file to extract the speech information file 404 included therein. The speech information file 404 passes to the optional hot spot distinguishing signal generator 436, the operation of which will be described below. If the speech file 112 is a hyperspeech file, the separation block also extracts the hot spot specifications and feeds the hot spot specifications 406 to the hot spot specifying block 438 and, via the path 435, to the URL specifying block 456.

The speech information file 404 passes from the hot spot distinguishing signal generator 436 to the speech signal generator 437, which derives the speech signal 122 from the speech information represented by the speech information file. The speech signal has a format suitable for transmission through the public network 230 to the user interface device 140 and capable of being processed by the user interface device. The speech signal passes from the speech signal generator to the network interface 408 for transfer to the public network.

Typically, the speech signal generator 437 includes a digital-to-analog converter that converts digitally-encoded speech information represented by the speech information file into an analog signal suitable for transmission through the public network 230 as the speech signal 122. Alternatively, the speech signal generator may include a transcoder that converts the digitally-encoded speech information represented by the speech information file into a digital speech signal having a digital format different from that of the digitally-encoded speech information. The digitally-encoded speech signal has a format suitable for transfer through the public network as the speech signal 122 and capable of being decoded by the user interface device 140. The speech signal generator may be omitted or substantially simplified if the public network is capable of transmitting, and the user interface device is capable of decoding, the digitally-encoded speech information represented by the speech information file 404 separated from the hyperspeech file 112 by the separation block 434. The speech signal generator may also be omitted or substantially simplified if the speech file includes a signal suitable for transmission through the public network as the speech signal 122.

The hot spot distinguishing signal generator 436 is required in embodiments of the speech file processor configured to operate in embodiments of the system 200 in which the hot spots are not distinguished in the speech information represented by the speech files received through the World-Wide Web 250. In embodiments of the system in which the hot spots are exclusively distinguished by the speech information represented by the speech files, the hot spot distinguishing signal generator may be omitted. When included, the hot spot distinguishing signal generator operates to generate a hot spot distinguishing signal that is added to the speech information represented by the speech information file 404 so that when the speech signal 122 is generated by the speech signal generator 437, the speech signal includes the hot spot distinguishing signal. The hot spot distinguishing signal generator operates in response to the control signal 414 generated by the hot spot specifying block 438.

The hot spot specifying block 438 receives the hot spot specifications 406 from the separation block 434 and stores them. The hot spot specifying block also receives the speech information file 404 from the separation block 434 and tracks time or counts bytes from the beginning of the speech information file as the speech information file is output by the separation block. The hot spot specifying block operates in response to each hot spot specification to generate the control signal 414 that is in a first state during the corresponding hot spot and that is otherwise in a second state.

The hot spot distinguishing signal generator 436 receives the control signal 414 from the hot spot specifying block 438. Each time the control signal is in the first state, the hot spot distinguishing signal generator generates a hot spot distinguishing signal and adds the hot spot distinguishing signal to the speech information represented by the speech information file 404. For example, the hot spot distinguishing signal generator may generate a distinguishing tone as the hot spot distinguishing signal and may mix the distinguishing tone with the speech information represented by the speech information file 404 output by the separation block 434. When the speech information represented by the speech information file is processed by the speech signal generator 437, the resulting speech signal 122 is transferred to the user interface device 140 and the speech information is presented by the user interface device, the distinguishing tone is presented to the user together with the speech information during each hot spot.

Alternatively, if the user interface device 140 is of the type that distinguishes the hot spots non-aurally, such as by vibration or by light, as described above, the hot spot distinguishing signal generated by the hot spot distinguishing signal generator 436 and mixed with the speech information file is used to control a vibration transducer or to switch a light on and off in the user interface device. The hot spot distinguishing signal remains with the speech signal 122 transmitted from the speech file processor 420 to the user interface device 140, is extracted from the speech signal by the user interface device, and is used to control the vibration transducer or the light, as will be described in more detail below.

The user interface device 140 operates in response to the speech signal 122 to present to the user the speech information represented by the speech information file 404 extracted from the speech file 112, as described above. If the speech file is a hyperspeech file, the user will hear hot-spot phrases while listening to the speech information. Each hot spot phrase identifies an item of additional speech information. When a hot-spot phrase identifies the item of additional speech information that the user wants to hear, the user will cause the user interface device to provide a user request signal during the hot spot. The user request signal indicates that the user wants to hear the item of additional speech information. To cause the user interface device to provide the user request signal, the user may, for example, press a button on the user interface device, as will be described in more detail below. In response to the user pressing the button, the user interface device generates the user request signal 142 and transfers the user request signal to the speech file processor 120 through the public network 230.

The public network interface 408 receives the user request signal 142 and feeds it to the request signal detector 454. The request signal detector forms part of the speech file retrieval module 420. The request signal detector 454 determines the signal type of each user request signal it receives. If the user request signal is the type of user request signal transmitted by the user interface device 140 in response to the user pressing the button on the user interface device during a hot spot, the request signal detector generates the control signal 416 that it sends to the URL specifying block 456.

In response to the control signal 416 generated by the request signal detector 454, the URL specifying block 456 references the URL included in the hot spot specification of the currently-valid hot spot and transfers the URL to the web interface 402 as an identifier of the speech file representing the item of additional speech information requested by the user. The web interface transfers the URL 124 to the World-Wide Web 250. In this example, part of the URL transferred to the World-Wide Web identifies the Web site 210. The URL passes through the World-Wide Web to the Web site 210, where the remainder of the URL identifies one of the speech files stored in the speech file storage device 110. In response to the URL, the specified speech file is read from the speech file storage device, and transfers through the World-Wide Web from the Web site 210 to the speech information gateway 220 and the speech file processor 120. The speech file is then processed by the speech file processor to generate a speech signal for transfer through the public network 130 to the user interface device 140, as described above.

In its simplest form, the user interface device 140 includes a single button that the user can push during a hot spot to request the additional speech information identified by the corresponding hot-spot phrase. This single button may be one key, such as the star key "*", on the keypad of a push-button telephone, for example. In its simplest form, the request signal detector 454 is only capable of responding to the request signal generated by the user pressing the one button on the user interface device. More sophisticated embodiments of the user interface device may have additional push buttons providing additional functions. The additional push buttons may be additional ones of the keys on the keypad of a push-button telephone, for example, or may be serial combinations of two or more of such keys. The additional push buttons may, for example, provide the user with navigation functions, such as returning to an earlier hot spot, skipping to a later hot spot, automatically returning to the previously-presented speech information, and automatically returning to the initially-presented speech information.

The speech file processor 120 may have different control modes, and may be switchable by the user from one control mode to another. For example, the speech file processor may have a push-button control mode, as described above, in which it is controlled by signals generated by the user pushing control buttons. The speech file processor may also have a speech control, in which it is controlled by the user's speech. The control mode of the speech file processor is changed by the user causing the user interface device to generate a mode-change user request signal 142. To change from the push-button control mode to the speech control mode the user may press one of the additional push buttons or may press a serial combination of push buttons, for example, to cause the user interface device to generate the mode-change user request signal. The mode-change user request signal is transferred from the user interface device 140 through the public network 230 to the speech file processor 120. In the speech file processor, the request signal detector 454 interprets the mode-change user request signal as a request to activate the speech recognition block 458. Once the speech recognition block is activated, the request signal detector feeds the spoken user request signals that it receives to the speech recognition block for speech recognition processing. To change from the speech control mode to the push-button control mode, the user may speak a command word to cause the user interface device to generate the mode-change user request signal.

Each speech file may include two speech information files representing the speech information. The speech information in the two speech information files is the substantially the same, but differs in the prompts given to the user for responding to the hot spots. The control signal fed from the request signal detector 454 to the separation module 434 selects which of the two speech information files is fed to the hot spot distinguishing signal generator 436 in accordance with the control mode selected by the user. For example, in the speech control mode, the prompt given to the user may state: "Say 'this' when you hear the name of the city in which you are located," whereas in the push-button control mode, the same prompt may state: "Press the star key when you hear the name of the city in which you are located."

In the push-button control mode, the user may press others of the additional push buttons, or may press other serial combinations of the push buttons to generate additional user request signals. The additional user request signals are transferred from the user interface device 140 through the public network 230 to the speech file processor 120. The request signal generator 454 interprets such additional user request signals as navigation commands, and issues commands to the hot spot distinguishing signal generator 436, the hot-spot specifying block 438 and the URL specifying block 456 to accomplish the navigation operation defined by the additional user request signal. Navigation operations in which previously-presented speech information is presented again are accelerated if the speech information files representing such speech information are cached in the speech file processing module 410. In the speech control mode, such navigation operations may be performed by the user speaking simple command words such as "previous," "next" and "home" that are recognized by the speech recognition block 458.

Finally, in the push-button control mode, the user may use the push buttons on the user interface device 140 to specify the URL of the web site at which is stored the speech file representing the initial speech information of the user's search for the desired speech information. The user may press further ones of the additional push buttons, or may press further serial combinations of the push buttons to generate a user request signal header that indicates remainder of the user request signal defines a URL. The remainder of the user request signal may be generated by the user pushing a series of the buttons 0–9 on the key pad of the user interface device. The complete user request signal is transferred from the user interface device 140 through the public network 230 to the speech file processor 120. The request signal detector 454 interprets the user request signal header as indicating that the remainder of the user request signal specifies a URL. The request signal detector then converts the tones representing the URL into a numerical URL. The numerical URL is passed to the URL specifying module 456, which transfers the URL to the World-Wide Web through the web interface 402.

In the speech control mode, the user may speak a command word that indicates that the numbers spoken following the command word define a URL. The numbers spoken by the user are recognized by the speech recognition block 458 that provides respective numerical codes to the request signal detector 454. The request signal detector translates the numerical codes into a numerical URL for transfer to the URL specifying module 456, as just described.

Figure 10:
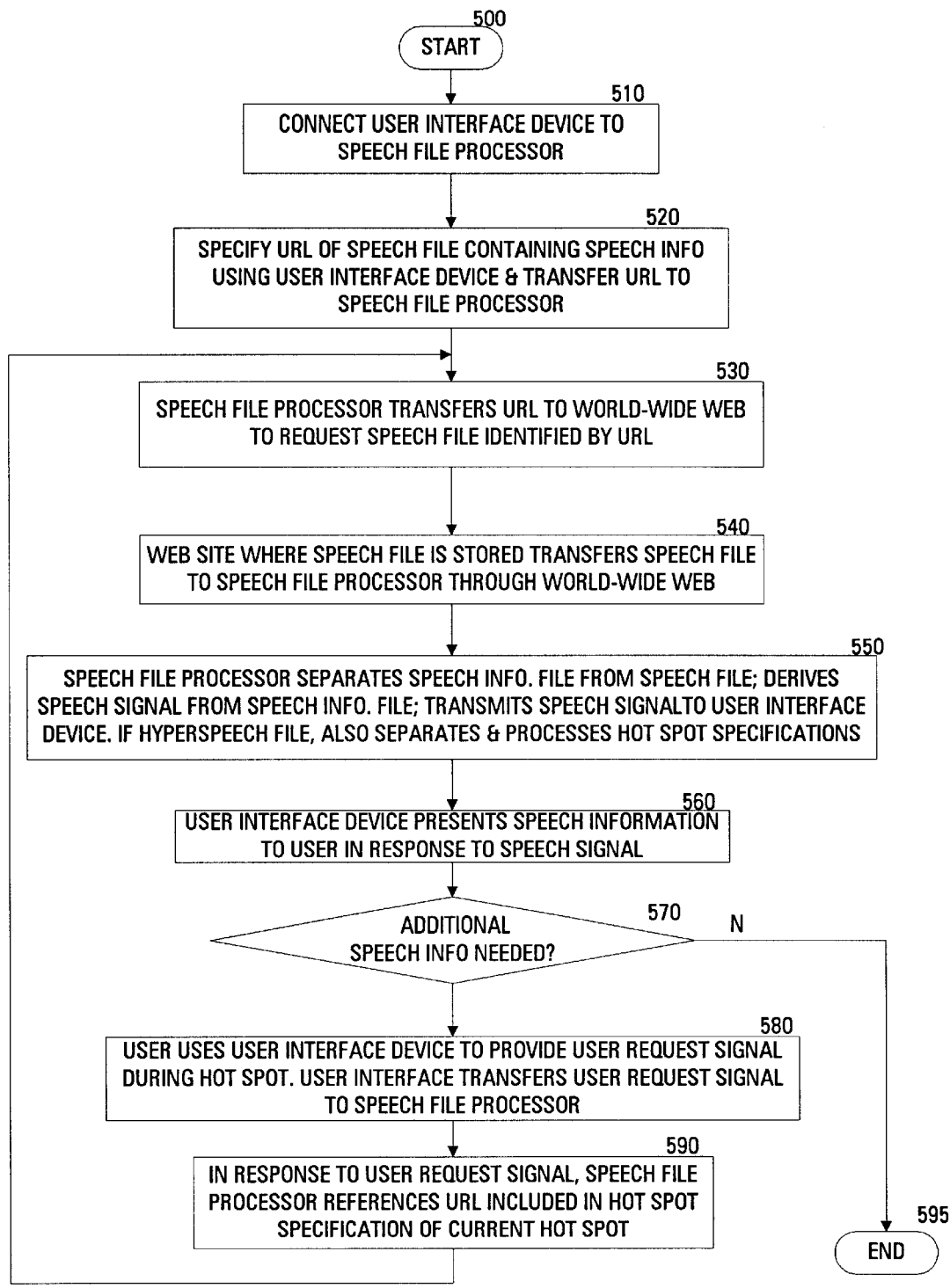
FIG. 10 is a flow chart of the processing performed a preferred embodiment of the system and method according to the invention for retrieving and presenting speech information.

FIG. 10 is a flow chart showing the processing performed by an example of the speech information retrieval and presentation system 200 shown in FIG. 7. In the example shown, a push-button telephone is used as the user interface device 140. Processing starts at step 500.

In step 510, the user causes the user interface device 140 to connect to the speech file processor 120. For example, the user who wants to obtain speech information uses the push-button telephone used as the user interface device to make a dial-up connection to the speech file processor through the public network 230.

In step 520, the user causes the user interface device 140 to specify the URL of the World-Wide Web site at which is stored the speech file representing the initial speech information of the user's search for the desired speech information. The user interface device transmits the URL as a user request signal 142 to the speech file processor 120. For example, the user may use the keypad of the push-button telephone to input the URL. In user interface devices designed for specific speech information services, or user interface devices designed for simplified operation, the dial-up information and the URL of the World-Wide Web site may be pre-programmed into the user interface device, and the user may not be required to enter the URL by hand or by speaking.

In step 530, the speech file processor 120 transfers the URL specified by the user to the World-Wide Web 250. At the Web site 210, part of the URL identifies the speech file storage device 110 that stores the speech files representing speech information for delivery through the World-Wide Web. Another part of the URL may identify the speech file representing the initial speech information if multiple ones of such speech files are stored on the speech file storage device 110.

In step 540, in response to the URL, the speech file storage device 110 transfers the speech file 112 specified by the user to the speech file processor 120 through the World-Wide Web 250.

In step 550, the speech file processor 120 receives the speech file 112 from the speech file storage device 110, separates the speech information file 12 from the speech file and derives the speech signal 122 from the speech information file. Deriving the speech signal from the speech information file typically involves processing the speech information file. The speech file processor transfers the speech signal through the public network 230 to the user interface device 140. When the speech file is a hyperspeech file, the speech file processor also extracts from the hot spot specifications from the hyperspeech file and transfers them to the hot-spot specifying module 438.

In step 560, the user interface device 140 presents the speech information to the user in response to the speech signal 122 received via the public network 230. When the speech file received by the speech file processor is a hyperspeech file, the speech information presented to the user includes hot spots that are aurally or otherwise distinguished from the remainder of the speech information to enable them to be recognized by the user. For example, the ear speaker in the handset of the push-button telephone, or the loudspeaker of the push-button telephone, may present the speech information to the user in response to the speech signal 122.

In step 570, during a hot spot, the user decides whether he or she want to hear the item of additional speech information identified by the hot-spot phase of the hot spot. If the currently-presented speech information is the speech information desired by the user and the user therefore does not want to hear any additional speech information, the objective of the user has been achieved, and a NO result is obtained in this step. When a NO result is obtained in step 570, processing advances to step 595, where the retrieval and presentation of the speech information ends. On the other hand, if the user wants to hear the item of additional speech information, a YES result is obtained in step 570, and processing advances to step 580.

In step 580, the user causes the user interface device 140 to provide a user request signal during the hot spot. The user request signal indicates that the user wants to hear the item of additional speech information identified by the hot-spot phrase. For example, during the hot spot, the user may push the star "*" key on the telephone keypad to provide the user request signal requesting the item of additional speech information. A period without words may follow the hot-spot phrase to give the user time to consider the hot-spot phrase and to respond accordingly. This period may be a period of silence. Alternatively, the above-described hot spot distinguishing tone that distinguishes the hot spot from the remainder of the speech information may continue through the period.

At step 590, in response to the request signal 142 provided by the user, the speech file processor 120 references the URL in the hot spot specification of the hot spot. For example, the user may press the star "*" key on the telephone keypad to cause the push-button telephone acting as the user interface device 140 to transfer the user request signal 142 to the speech file processor 120. The speech file processor detects the user request signal and references the URL of the hot spot specification of the hot spot.

Execution then returns to step 530, where the speech file processor 120 transfers the URL referenced in step 590 to the World-Wide Web to request the speech file identified by the URL. The speech file represents the item of additional speech information that the user wanted to hear.

If the speech file requested in step 530 is not a hyperspeech file, processing will always end at step 595. However, if the speech file requested is a hyperspeech file, step 530 to step 570, and possibly steps 580 and 590 will be repeated at least once. Further repetition of this loop is stopped either by a NO result at step 570, indicating that the user has heard the desired speech information, or by the user requesting a speech file that is not a hyperspeech file in step 530.

In step 580, the user can activate different capabilities of the speech file processor 120 by pressing different keys on the push-button telephone acting as the user interface device 140. Combinations of the pound key "#", the star key "*", and the numerical keys can be used, for example. As specific examples, the user can sequentially push the keys "#" and "0" to cause the system to repeat presentation of the speech information represented by a speech information file in a speech file analogous to a home page, the keys "#", "*" and "1" to return to the previous hot spot, the keys "#", "*" and "2" to return to the hot spot before the previous hot spot, the keys "#" and "1" to skip the next hot spot, and the keys "#" and "2" to skip the next two hot spots. If the user forgets the instructions that use a combination of the star key "*", the pound key "#" and the numerical keys, the user can change to the speech control mode as will be described below. Alternatively, navigation can be accomplished by providing appropriate hot spots. For example, the speech information can include the following sentence that includes three hot-spot phrases: "Press star now to move to the previous page, . . . to the next page, . . . or to the home page." Presentation of each of the underlined phrases is accompanied by an indication that each phrase constitutes a hot-spot phrase. While hearing the sentence, the user can press the star key during the one of the hot spots whose hot-spot phrase indicates the navigation operation that the user wishes to perform. The speech file processor will operate in response to the tone generated by the user interface when the user presses the star key to provide the user with the speech information he or she requests, i.e., the speech information on the page corresponding to the hot spot that was active when the user pressed the star key.

An example was described above in which the hot spots are distinguished from the remainder of the speech information by a distinguishing tone superimposed by the speech file processor 120 on the speech signal transferred to the user interface device. However, hot spots may be distinguished from the remainder of the speech information in different ways. Instead of superimposing a distinguishing tone, hot spots can be distinguished by the speech information being spoken by a male voice and the hot spots being spoken by a female voice, for example. In addition, the hot spots can be distinguished in ways detectable by the senses other than the user's sense of hearing.

As one example, a vibration transducer can be included in a part of the user interface device 140 that is held by the user. During each hot spot, the speech file processor 120 can generate the hot spot distinguishing signal that is included in the speech signal transferred to the user interface device. The hot spot distinguishing signal activates the vibration transducer during each hot spot. Alternatively, the user interface device can include a lamp or other light-generating device that is activated by the hot spot distinguishing signal to generate light during each hot spot.

Figure 11:
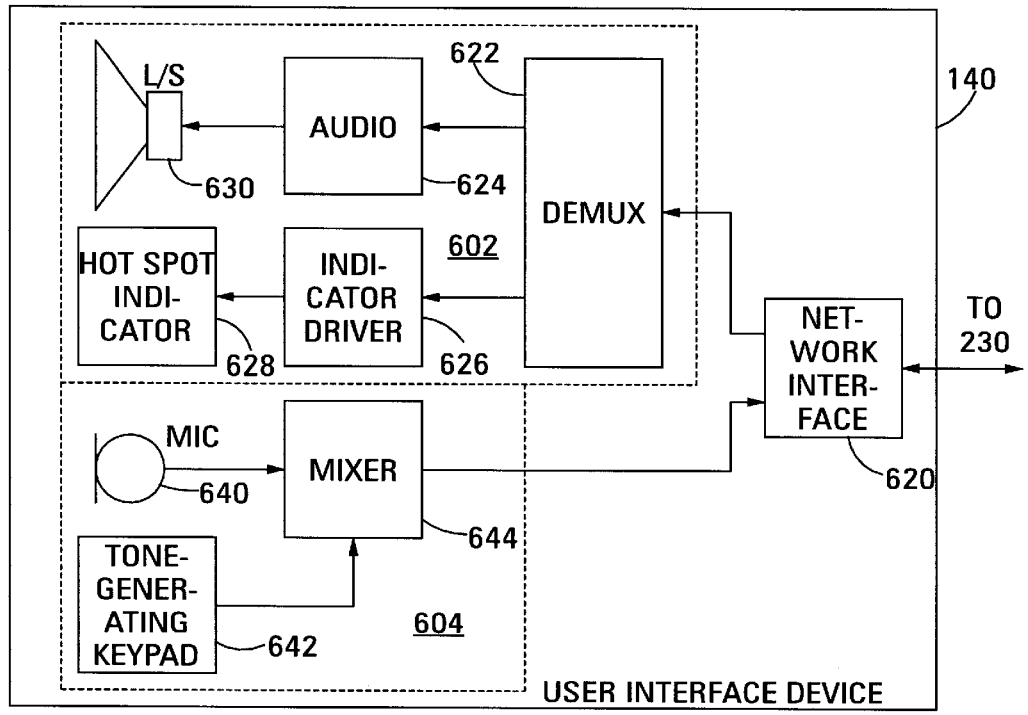
FIG. 11 is a block diagram of a embodiment of the user interface device forming part of the system and method according to the invention for retrieving and presenting speech information.

FIG. 11 is a block diagram showing an example of an embodiment of the user interface device 140 that includes elements to implement various ways of indicating the hot spots. The user interface device is composed of the presentation module 602 and the user request signal generator 604. The speech signal 122 transmitted by the speech file processor 120 includes not only an audible speech signal, but also an inaudible hot spot distinguishing signal superimposed on the audible speech signal during each hot spot. The speech signal is received from the public network 230 via the network interface 620. Signals pass from the public network to the user interface device and from the user interface device to the public network through the network interface.

The demultiplexer 622 receives the speech signal 122 from the network interface 620 and extracts the hot spot distinguishing signal from it. The speech signal passes to the audio module 624 that generates from the speech signal an audio signal suitable for driving the loudspeaker 630. The audio module may include a digital-to-analog converter for use when the speech signal is a digital signal. The loudspeaker operates in response to the audio signal to present the speech information to the user.

The hot spot distinguishing signal passes from the demultiplexer 622 to the indicator driver 626. In response to the hot spot distinguishing signal, the indicator driver generates a transducer drive signal that drives the transducer 628. In this example, the transducer mechanically vibrates part of the user interface device 140 held by the user to indicate each hot spot to the user. However, the transducer is not limited to one that operates by mechanical vibration; for example, the transducer can be a lamp that distinguishes each hot spot by generating light detected by the user's sense of sight.

In the description set forth above of the processing performed in step 580 of the flow chart shown in FIG. 10, the user was described as pressing a key on the keypad of a push-button telephone to provide a user request signal indicating that he or she wanted to hear an item of additional speech information. The user was also described above as being able to press other keys to switch the control mode of the speech file processor 120 to a speech control mode in which the user indicates that he or she wants to hear an item of additional speech information by speaking instead of pressing the keys of the push-button telephone. For example, the user can switch the control mode from the push-button control mode to the speech control mode by pressing the star key twice, i.e., "**".

In the speech control mode, the user can speak the control word "this," for example, during a hot spot instead of pressing the star key "*" to provide a user request signal indicating that he or she wants to hear the additional speech information identified by the hot-spot phrase of the hot spot. Examples of control words that can be spoken by the user include "back," "next," and "home."

Referring once more to the block diagram shown in FIG. 11, the user request signal generator 604 includes the keypad 642 that generates at least one tone as the user request signal in response to the user pressing a button. The user request generator also includes the microphone 640 that, in response to the user's voice speaking control words, generates an audio control signal as the user request signal. In a telephone-based user interface device, the microphone and the loudspeaker 630 may be located in a hand set. The user request signals generated by the keypad and the microphone, amplified if necessary, pass to the mixer 644 where they are mixed so that the user request signals generated by the keypad or the microphone can provide the user request signal 142. The user request signal 142 passes through the network interface 620 to the public network 230, and thence to the speech file processor 120 (FIG. 9).

Referring now to the block diagrams shown in FIGS. 9 and 11, when the user switches to speech control mode by, for example, pressing the star key on the keypad 642 twice, i.e., "**", the control mode in the speech file processor 120 switches from the push-button control mode to the speech control mode. When the speech control mode is active, the microphone 640 in the user interface device 140 generates user request signal in response to each control word spoken by the user. The user interface device transfers the user request signal to the speech file processor 120 as the user request signal 142.

In the speech file processor 120, the user request signal 142 passes to the request signal detector 454 in the speech file retrieval module 420. Since the speech file processor is in its speech control mode, the request signal detector forwards the user request signal to the speech recognition block 458. The speech recognition block performs a speech recognition operation on the user request signal, and returns a user request control signal to the request signal detector 454.

The user request control signal generated by the speech recognition block 458 is in one of a number of different possible states. Each of the possible states of the control signal corresponds to one of the vocabulary of control words that the speech recognition block is capable of recognizing. The state of the user request control signal corresponds to the control word spoken by the user, as represented by the user request signal 142. The request signal detector 454 sets its various output signals in accordance with to the state of the user request control signal generated by the speech recognition block in response to the user request signal representing the control word spoken by the user.

The speech recognition block 458 is configured to be capable of recognizing only simple control words, such as the examples set forth above, so that it can be implemented using conventional technology and does not require training by the user. Operating the speech file processor 120 in the speech control mode enables a disabled user who is incapable of operating a push-button device, such as a push-button telephone, or a user who is visually impaired, to retrieve speech information and to have such speech information presented.

The invention is not limited to an embodiment in which the speech signal is transferred via a public network or to on in which the speech files are transferred via the World-Wide Web. The invention can be used in a broad range of environments in which the speech files and speech signal are transferred in many different ways.

The invention can be used to provide speech information in a large variety of different applications and is not limited to the examples given. The invention can be applied to such hierarchical information systems as product support resource guides, sales guides, product information, medical information, weather reports, etc.

The invention has a greatly improved ability to retrieve and present the exact speech information desired by the user.

In the example just described, the speech file processor 120 that forms part of the invention is connected to a public network and the speech processor is linked to the speech files through the World-Wide Web. However, the invention is not limited to this. The speech file transfer link and the speech information storage device can be integrated with the speech file processor.

Next, an example will be briefly described in which the system according to the invention is used to provide a guide to product support resources for a product. In this example, a push-button telephone serves as the user interface device 140. After using the user interface device to dial the product support number set forth in the manual for the product, for example, a first speech file is automatically retrieved. This speech file is a first hyperspeech file. The speech file processor 120 processes the speech file to generate a speech signal. The speech signal, when reproduced by the user interface device, causes the user to hear the announcement: "Please press the star key when you hear the name of the city in which you are located: Tokyo, Kanagawa, Saitama, Yamanashi." Presentation of each of the underlined words is accompanied by an indication that each word constitutes a hot-spot phrase.

When the user hears the name of the city in which he or she is located, the user presses the star key on the telephone providing the user interface device 140. This causes the telephone to generate the user request signal 142. In response to the user request signal generated by the user pressing the star key when the name of one of the four cities was presented, the speech file processor 120 performs a speech file retrieval operation that retrieves a second speech file. The second speech file corresponds to the city indicated by the user. In this example, the second speech file is a second hyperspeech file that includes a speech information file representing speech information relating to the city indicated by the user request signal, and that also includes hot spot specifications.

When the speech information represented by the speech information file in the second speech file is presented to the user, a list of districts in the city indicated by the user is presented, together with an invitation for the user to press the star key when the user hears the name of the district in which he or she is located. The user presses the star key when he or she hears the name of the district. In response to this second user request signal generated by the user pressing the star key when the name of the district in which the user is located is presented, the speech file processor performs a speech file operation that retrieves a third speech file. The third speech file may be another hyperspeech file that includes hot spots for various sub-districts in the chosen district. Alternatively, the third speech file may lack hot spot specifications, and simply contain a speech information file that represents the speech information desired by the user, i.e., the name and address of the service center closest to the user's location.

Alternatively, the speech information desired by the user may be represented by a speech file that is a hyperspeech file. Representing the desired speech information by a hyperspeech file gives the user the ability to request additional or alternative speech information after or during presentation of the desired speech information to the user. For example, the hyperspeech file may give the user the ability to elect to hear the name and address of the service center in another district of the chosen city, or in another city. This way, the user can quickly obtain the name, address and telephone number of the service center that is most conveniently located relative to the user's location.

In embodiments of the system configured to accept multi-key commands, the user can use other keys in addition to the star key to perform navigation operations that permit the user to search more efficiently.

The invention provides the following advantages. It enables simple operating methods to be used to retrieve and present the specific speech information desired by the user. The invention also allows the user to select the amount of detail included in the speech information presented. Speech information desired by the user can be retrieved for presentation to the user from almost anywhere in the world using the World-Wide Web. Such information can be retrieved without a conventional computer terminal if a suitable user interface device is available. The user interface may be as simple as a conventional push-button telephone. Finally, people who are physically or visually handicapped can use the method and system according to the invention to retrieve desired speech information and to have such information presented to them.

Although this disclosure describes illustrative embodiments of the invention in detail, it is to be understood that the invention is not limited to the precise embodiments described, and that various modifications may be practiced within the scope of the invention defined by the appended claims.

We claim:

1. A method of retrieving and presenting a desired item of speech information, the method comprising:
    providing speech files, each of the speech files representing an item of speech information, at least one of the speech files being a hyperspeech file representing an item of speech information and including a hot spot specification specifying a hot spot in the item of speech information, the hot spot specification comprising:
        a hot spot definition defining the hot spot in the speech information, the speech information identifying additional speech information during the hot spot, and
        an identifier identifying an other of the speech files, the other of the speech files representing the additional speech information; and
    iteratively performing a speech information presentation operation until the speech information presented is the desired speech information, the speech information presentation operation including:
        (a) retrieving one of the speech files,
        (b) separating from the one of the speech files any hot spot specification comprised therein and generating a speech signal from the one of the speech files, the speech signal including a distinguishing portion corresponding to each hot spot,
        (c) in response to the speech signal, presenting the speech information, the distinguishing portion included in the speech signal distinguishing the hot spot from a remainder of the speech information during presentation of the speech information,
        (d) when the speech information presented in step (c) is not the desired speech information, providing a user request signal during the hot spot to request presentation of an item of additional speech information identified by the speech information presented during the hot spot, and
        (e) in response to the user request signal, referencing the identifier included in the hot spot specification to identify the one of the speech files retrieved when step (a) is next performed.

2. The method of claim 1, additionally comprising:
    providing:
        at least one speech file storage device, and
        a speech file processor;
    storing the speech files on at least one of the at least one speech file storage device; and
    retrieving the one of the speech files includes linking the speech file processor to the one of the speech file storage devices on which the one of the speech files is stored.

3. The method of claim 2, in which, in linking the speech file processor to the one of the speech file storage devices, the linking is performed using the World-Wide Web.

4. The method of claim 1, in which
    the method additionally comprises:
        providing:
            a speech file processor; and
            a user interface device,
        linking the user interface device to the speech file processor; and
    in presenting the speech information, the speech information is presented by the user interface device.

5. The method of claim 4, in which, in providing a user request signal, the user request signal is provided using the user interface device.

6. The method of claim 4, in which, in linking the user interface device to the speech file processor, the user interface device is linked to the speech file processor using a public network.

7. The method of claim 1, in which the distinguishing portion included in the speech signal is a portion of speech information that is aurally distinguished from the remainder of the speech information during presentation of the speech information.

8. The method of claim 1, additionally comprising:
    generating a distinguishing tone in response to the distinguishing portion included in the speech signal; and
    presenting the distinguishing tone simultaneously with the speech information during the hot spot.

9. The method of claim 1, additionally comprising:
    providing a transducer that generates a stimulus detectable by a human sense other than hearing;
    generating a hot spot indicator signal in response to the distinguishing portion included in the speech signal during the hot spot; and
    feeding the hot spot indicator signal to the transducer.

10. The method of claim 1, in which:
    in providing the user request signal, a user request signal having one of two distinct modes is provided;
    referencing the identifier included in the hot spot specification includes detecting the user request signal, the detecting being responsive to only one of the distinct modes of the user request signal; and the method additionally comprises:
providing an additional user request signal to change the detecting to being responsive to the other of the distinct modes of the user request signal.

11. The method of claim 10, in which the one of the distinct modes of the user request signal is a tone mode and the other of the distinct modes is a speech mode.

12. A system for retrieving and presenting a desired item of speech information, the system comprising:
speech files, each of the speech files representing an item of speech information, at least one of the speech files being a hyperspeech file representing an item of speech information and including a hot spot specification specifying a hot spot in the item of speech information, the hot spot specification comprising:
a hot spot definition defining the hot spot in the speech information, the speech information identifying additional speech information during the hot spot, and
an identifier identifying an other of the speech files, the other of the speech files representing the additional speech information; a hyperspeech file processor, including:
a speech file retrieval module that retrieves an identified one of the speech files in response to a user request signal, and
a speech file processing module that separates from the one of the speech files retrieved by the speech file retrieval module any hot spot specification comprised therein and that generates a speech signal from the one of the speech files, the speech signal including a distinguishing portion corresponding to each hot spot;
a user interface device linked to the hyperspeech file processor and including:
a presentation module that presents speech information in response to the speech signal received from the hyperspeech file processor, the distinguishing portion included in the speech signal distinguishing the hot spot from a remainder of the speech information during presentation of the speech information, and
a user request signal generator that generates the user request signal for transmission to the hyperspeech file processor during the hot spot to request presentation of an item of additional speech information identified by the speech information presented during the hot spot, in which:
the speech file retrieval module of the speech file processor additionally includes an identifying module that operates in response to the user request signal to reference the identifier included in the hot spot specification to identify a next one of the speech files to be retrieved by the speech file retrieval module, the next one of the speech files representing the item of additional speech information.

13. The system of claim 12, in which:
the system additionally comprises at least one speech file storage device (110) on which the speech files are stored; and a speech file transfer link linking the speech file processor to the at least one speech file storage device.

14. The system of claim 13, in which, the speech file transfer link includes a portion of the World-Wide Web.

15. The system of claim 12, in which the system additionally comprises a speech signal transfer link linking the speech file processor and the user interface device.

16. The system of claim 15, in which the speech signal transfer link includes a portion of a public network.

17. The system of claim 12, in which the distinguishing portion included in the speech signal is a portion of speech information that is aurally distinguished from the remainder of the speech information during presentation of the speech information.

18. The system of claim 12, in which:
the speech file processing module includes a tone generating module that generates a distinguishing tone in response to the hot spot specification extracted from the speech file, and that adds the distinguishing tone to the speech signal as the distinguishing portion thereof; and
the presentation module includes a loudspeaker that simultaneously presents the distinguishing tone and the speech information during the hot spot.

19. The system of claim 12, in which:
the speech file processing module includes a tone generating module that generates a hot spot indicator signal in response to the hot spot specification extracted from the speech file, and that adds the hot spot indicator signal to the speech signal as the distinguishing portion thereof; and
the presentation module includes:
a transducer driver that separates the distinguishing portion from the speech signal and, during the hot spot, generates a hot spot indicator signal in response to the distinguishing portion, and
a transducer that operates in response to the hot spot indicator signal to generate a stimulus detectable by a human sense other than the sense of hearing.

20. The system of claim 12, in which:
the user request signal generator includes:
a module that generates the user request signal in a first mode, and
a module that generates the user request signal in a second mode, distinct from the first mode;
the speech file retrieval module includes:
a first detection module that detects the user request signal in the first mode, and
a second detection module that detects the user signal in the second mode; and
the detection modules include a change-over module, responsive to an additional user request signal, to activate one of the first detection module and the second detection module.

21. The system of claim 20, in which the first mode of the user request signal is a tone mode and the second mode is a speech mode.

* * * * *